Figure 1:
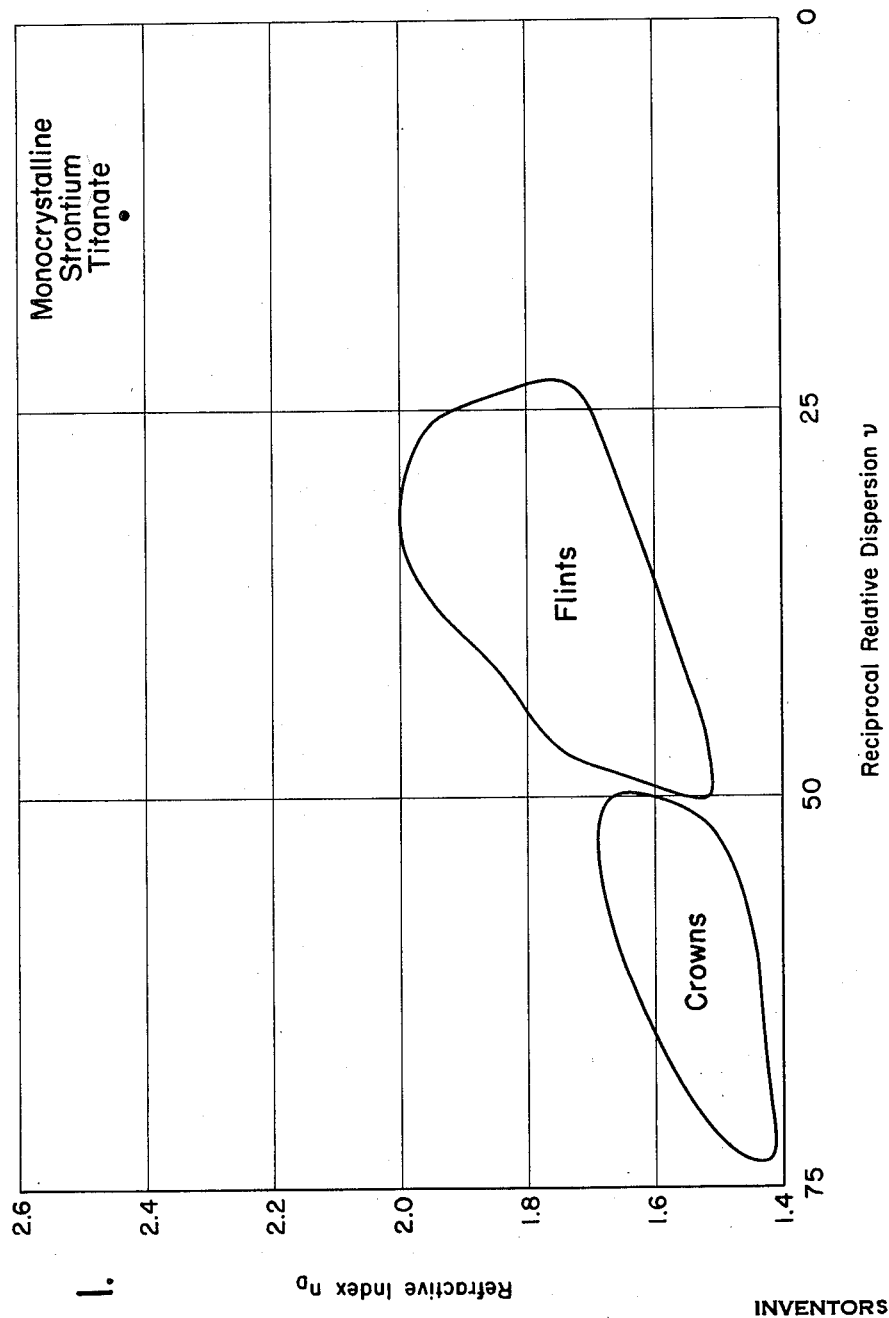

Feb. 10, 1953 L. MERKER ET AL 2,628,156
OPTICALLY GLASS-LIKE MATERIAL
Filed Oct. 24, 1951

INVENTORS
Leon Merker
Langtry E. Lynd
BY
Charles F. Kaegebehl
ATTORNEY

Patented Feb. 10, 1953

2,628,156

UNITED STATES PATENT OFFICE 2,628,156

OPTICALLY GLASS-LIKE MATERIAL

Leon Merker, New York, N. Y., and Langtry E. Lynd, South Plainfield, N. J., assignors to National Lead Company, New York, N. Y., a corporation of New Jersey Application October 24, 1951, Serial No. 252,906

4 Claims. (Cl. 23—51)

This invention relates to optically glass-like material. More specifically it relates to optically glass-like material which is highly refractive. Furthermore it relates to optical material which possesses very high refractive index with high dispersion.

Many types of material have been used in the optical industry. For the most part these materials have consisted of glasses of various compositions. The optical characteristics of glasses, which are usually indicated by a measure of the index of refraction and also by measure of the dispersive quality vary over a considerable range. For example, crown glasses and flint glasses, the two general types of optical glass, have an index of refraction for the D line $\eta_D$ varying from about 1.45 to 1.65 and from about 1.5 to 2.0 respectively. These glasses also tend to disperse or separate complex light into its constituent colors, and the degree of dispersion, usually measured as the reciprocal relative dispersion or $\nu$ value, also varies from 50 to 75 for crown glass and from 19 to 50 for flint glass. Since the dispersion is hereinafter expressed in this specification as the reciprocal relative dispersion or $\nu$ value, it should be remembered that material having high dispersion will possess low $\nu$ values.

One broad use of optical materials having high refractive indices and high dispersion is in the manufacture of lenses and prisms. For example, materials having a high index of refraction are utilized in the construction of optical systems such as telescopic or high magnification microscopic objectives. Furthermore combinations of optical materials which individually possess widely variant optical properties are used to prepare achromatic lenses. High dispersion qualities are also useful for making prisms and the like.

An object of this invention therefore is to provide an optically glass-like material which possesses exceedingly high index of refraction with a high dispersion or relatively low $\nu$ value. A further object is to provide an optically glass-like material suitable for manufacture of lenses of high magnifying power. A still further object is to provide an optically glass-like material having a high index of refraction which is simple and economical to manufacture. Further to provide as a new article of manufacture a body shaped for optical usefulness. These and other objects will become apparent from the following more complete description of the invention.

Broadly this invention contemplates high refractive glass-like material formed by co-fusing of strontium titanate particles into a monocrystalline mass. This invention further contemplates as a new article of manufacture a body shaped for optical usefulness composed of a monocrystalline mass of strontium titanate.

The term strontium titanate is intended to embrace both pure and substantially pure material, the latter which contains impurities or added coloring or modifying agents either present or added which are of a nature and in amount so as to not affect the monocrystalline structure of the strontium titanate material produced. In most cases the impurities or modifying agents will not exceed a few tenths of a per cent up to no more than about 1%.

In order to prepare a monocrystalline mass by co-fusing particles of strontium titanate, it is necessary to employ high temperatures. Strontium titanate melts in the neighborhood of 2100° C. and it is therefore preferred to use an oxygen-hydrogen torch in order to obtain the necessary temperatures. It is convenient to drop finely divided strontium titanate particles into the area of intense heat formed by the oxygen-hydrogen torch. Within this area the strontium titanate melts and when carefully cooled builds up as a single crystal on a base which holds the molten strontium titanate material. In order to start such a single crystal to form it is desirable to first crystallize a small pool of strontium titanate material on the base and then gradually increase the amount of molten material on the top of the crystal so formed. Such a procedure allows the crystal to build up upon itself gradually increasing in diameter until a carrot-shaped single crystal or boule of strontium titanate is formed. By controlling the orifices of the oxygen-hydrogen torch it is possible to increase the size of the intensely heated zone which will result in a larger diameter of the carrot-shaped crystal.

Substantially any type of combustible gases and most any design of equipment may be utilized provided sufficient temperature is obtained over a concentrated area in which the crystal may be formed.

It is preferred to employ a strontium titanate powdered material which is substantially free from objectionable or incompatible impurities which detrimentally would affect the crystal structure. Starting material should be finely divided and fairly uniform in size. Such a material may be conveniently prepared by first reacting titanium oxalate with strontium chloride to precipitate strontium titanium oxalate. After thoroughly washing the strontium titanium oxalate, it is heated at a temperature of at least 500° C. to remove the oxalate portion thus forming strontium titanate. Preferably this strontium titanate material is then crushed and ground to obtain finely divided material from which the strontium titanate single crystal is subsequently formed.

Using an oxygen-hydrogen torch which utilizes a total gas flow of 35 liters per minute, oxygen and hydrogen combined, a carrot-shaped monocrystalline mass of strontium titanate 3/4 inch long and 1/2 inch in diameter was formed over a period of 4 1/2 hours. This carrot-shaped mass of strontium titanate was substantially black in color. However, upon annealing by heating in the presence of air over a period of 14 hours at 700° C. and then cooling for 4 hours, the material possessed a clear, substantially colorless and transparent appearance. Such a transparent carrot-shaped mass of monocrystalline glass-like material may be shaped into many bodies useful for optical purposes such as, for example, cut into lens blanks suitable for preparation of lenses, prisms and other optical products; and also it may be cut into various shapes and sizes to produce many articles such as ornamental objects and novelty gems, which depend for their attractiveness and usefulness on the high refractive index of the material of which they are composed.

In order to more fully describe the optical properties of the strontium titanate single crystal, a double convex lens was cut from a cross section of the strontium titanate single crystal. The cut lens had a radius of curvature of 2 centimeters, a diameter of 8.7 millimeters and a thickness of 2.5 millimeters. The lens had a focal length of 7 millimeters and a power of 143 diopters. The index of refraction $\eta_D$ was 2.409 with a reciprocal relative dispersion $\nu$ of 13.

For purposes of comparison a lens of the same size and shape cut from dense flint glass having an index of refraction of 1.9 possesses a focal length of 1.8 centimeters and a power of 84.5 diopters. The reciprocal relative dispersion $\nu$ for this glass was about 28.

For the purpose of comparison between crown glass and flint glass and monocrystalline strontium titanate, Fig. 1 is presented in which various glasses and strontium titanate crystal are plotted, with respect to their indices of refraction $\eta_D$ and reciprocal dispersion $\nu$. It is clearly shown that the strontium titanate single crystal has an index of refraction and a dispersion distinctly apart from the range of values of either crown or flint glass.

The index of refraction $\eta_D$ of the strontium titanate crystal is extremely high, i. e. about 2.4, and the reciprocal dispersion $\nu$ is about 13. These values will vary slightly as various types of starting materials and processing conditions are employed.

It should be noted that the strontium titanate lens of the instant invention which has been described has a high magnifying power and a short focal length. Such material is particularly useful for telescopic and microscopic objectives and the like, achromatic lenses and prisms and for other optical purposes which advantageously utilize wide fields, high apertures and short focal lengths. It should be noted that the index of refraction $\eta_D$ and reciprocal dispersion $\nu$ are very different from any type of known glass.

While this invention has been described and illustrated by the examples shown, it is not intended to be strictly limited thereto and other variations and modifications may be employed within the scope of the following claims.

We claim:

1. Highly refractive glass-like material consisting of a monocrystalline mass of strontium titanate having an index of refraction of about 2.4 and a reciprocal dispersion of about 13 formed by crystallizing fused strontium titanate particles as a boule.

2. A monocrystalline mass of strontium titanate as defined in claim 1 shaped in the form of a gem.

3. A monocrystalline mass of strontium titanate as defined in claim 1 shaped in the form of a lens.

4. A monocrystalline mass of strontium titanate as defined in claim 1 shaped in the form of an optical prism.

LEON MERKER.
LANGTRY E. LYND.

REFERENCES CITED

The following references are of record in the file of this patent:

UNITED STATES PATENTS

| Number | Name | Date |
|---|---|---|
| 988,230 | Verneuil | Mar. 28, 1911 |
| 1,004,505 | Verneuil | Sept. 26, 1911 |
| 1,436,164 | Goldschmidt | Nov. 21, 1922 |
| 2,467,169 | Wainer | Apr. 12, 1949 |
| 2,538,554 | Cherry, Jr. | Jan. 16, 1951 |
| 2,540,412 | Adler | Feb. 6, 1951 |

FOREIGN PATENTS

| Number | Country | Date |
|---|---|---|
| 252,698 | Switzerland | 1948 |
| 256,439 | Switzerland | 1949 |

OTHER REFERENCES

Mellor: Titanium Treatise on Inorganic and Theoretical Chemistry, v. 7, p. 54 (1927).

Barksdale: Titanium, p. 302 (1949).

Chem. Abstracts, v. 41 (1947): Column 5356—Blattner et al.; column 7193—Hulm; column 7193—Kay et al.

Chem. Abstracts, v. 44 (1940), column 6224—Merz.